United States Patent
Ishii et al.

(10) Patent No.: US 11,358,287 B2
(45) Date of Patent: Jun. 14, 2022

(54) INPUT DEVICE AND ROBOT CONTROL SYSTEM

(71) Applicant: Fanuc Corporation, Yamanashi (JP)

(72) Inventors: Yuki Ishii, Yamanashi (JP); Takashi Satou, Yamanashi (JP); Yihua Gu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 471 days.

(21) Appl. No.: 16/181,691

(22) Filed: Nov. 6, 2018

(65) Prior Publication Data

US 2019/0160689 A1 May 30, 2019

(30) Foreign Application Priority Data

Nov. 28, 2017 (JP) .............................. JP2017-228375

(51) Int. Cl.
*G05B 15/00* (2006.01)
*G05B 19/00* (2006.01)
(Continued)

(52) U.S. Cl.
CPC ............ *B25J 13/088* (2013.01); *B25J 9/0081* (2013.01); *B25J 13/02* (2013.01); *B25J 13/06* (2013.01);
(Continued)

(58) Field of Classification Search
CPC ...... B25J 13/088; B25J 13/065; B25J 9/0081; B25J 13/02; B25J 13/06; G05B 19/42;
(Continued)

(56) References Cited

U.S. PATENT DOCUMENTS

2012/0130541 A1 5/2012 Szalek
2014/0094825 A1* 4/2014 Flaherty ............. A61B 1/00039
606/130
(Continued)

FOREIGN PATENT DOCUMENTS

EP 0593047 A1 4/1994
GB 2240614 A 8/1991
(Continued)

OTHER PUBLICATIONS

Matsui, Hironori; Notice of Reasons for Refusal; Japanese Patent Application No. 2017-228375; dated Feb. 12, 2020; 5 pages.
(Continued)

*Primary Examiner* — Harry Y Oh
(74) *Attorney, Agent, or Firm* — Shackelford, Bowen, McKinley & Norton, LLP

(57) ABSTRACT

A compact, intuitively-operable input device for manipulating a robot is provided. Provided is an input device for manipulating a robot. The input device includes: a base; a movable section supported in a three-dimensionally movable manner relative to the base; and a detector that performs detection by resolving an operation amount of the movable section relative to the base into parallel movement amounts along a first axis and a second axis, which extend parallel to a predetermined surface of the base and are orthogonal to each other, and a parallel movement amount along a third axis that is orthogonal to the first axis and the second axis.

12 Claims, 6 Drawing Sheets

(51) Int. Cl.
  *B25J 13/08*   (2006.01)
  *B25J 13/06*   (2006.01)
  *G05B 19/42*   (2006.01)
  *B25J 9/00*    (2006.01)
  *B25J 13/02*   (2006.01)
  *G05G 1/00*    (2006.01)

(52) U.S. Cl.
  CPC ............ *B25J 13/065* (2013.01); *G05B 19/42* (2013.01); *G05G 1/00* (2013.01)

(58) Field of Classification Search
  CPC ........... G05B 2219/39436; G05B 2219/35419; G05G 1/00; G05G 9/047; G05G 9/04737; G06F 3/0338
  See application file for complete search history.

(56) References Cited

U.S. PATENT DOCUMENTS

| | | | | |
|---|---|---|---|---|
| 2015/0153842 | A1* | 6/2015 | Obermeyer | G05G 9/047 345/161 |
| 2017/0192427 | A1* | 7/2017 | Bivans | G05D 1/0038 |

FOREIGN PATENT DOCUMENTS

| | | | |
|---|---|---|---|
| JP | S58-172739 | A | 10/1983 |
| JP | S60-093547 | A | 5/1985 |
| JP | S63-011291 | A | 1/1988 |
| JP | S63-140603 | U | 9/1988 |
| JP | H08-057783 | A | 3/1996 |
| JP | H08-066882 | A | 3/1996 |
| JP | H10-202568 | A | 8/1998 |
| JP | H11-015595 | A | 1/1999 |
| JP | H11-305936 | A | 11/1999 |
| JP | 2007-094930 | A | 4/2007 |
| JP | 2010-264539 | A | 11/2010 |
| WO | WO-2014005607 | A1 * | 1/2014 ........... G05B 19/427 |

OTHER PUBLICATIONS

Matsui, Hironori; Notice of Reasons for Refusal; Japanese Patent Application No. 2017-228375; dated Nov. 12, 2019; 5 pages.

* cited by examiner

INPUT DEVICE AND ROBOT CONTROL SYSTEM

CROSS-REFERENCE TO RELATED APPLICATIONS

This application is based on Japanese Patent Application No. 2017-228375, the contents of which are incorporated herein by reference.

TECHNICAL FIELD

The present invention relates to input devices and robot control systems.

BACKGROUND ART

A known technology in the related art involves operating an input device attached to the hand of an industrial robot so as to change the position and orientation of the distal end of the robot (for example, see Japanese Unexamined Patent Application, Publication No. 2010-264539). A known example of the input device used for performing an input operation for changing the position and orientation of the distal end of the robot is a joystick-type input device (for example, see Japanese Unexamined Patent Application, Publication No. Hei 11-305936).

SUMMARY OF INVENTION

An aspect of the present invention provides an input device including: a base; a movable section supported in a three-dimensionally movable manner relative to the base; and a detector that performs detection by resolving an operation amount of the movable section relative to the base into parallel movement amounts along a first axis and a second axis, which extend parallel to a predetermined surface of the base and are orthogonal to each other, and a parallel movement amount along a third axis that is orthogonal to the first axis and the second axis.

Another aspect of the present invention provides a robot control system including the aforementioned input device and a control device that associates output values, corresponding to the parallel movement amounts along the first to third axes, output from the input device with parallel movement amounts along three orthogonal axes in a coordinate system set at a distal end of the robot.

Another aspect of the present invention provides a robot control system including the aforementioned input device and a control device that associates output values, corresponding to the parallel movement amounts along the first and second axes, output from the input device and an output value corresponding to the rotational movement amount about the third axis with rotational movement amounts about three orthogonal axes in a coordinate system set at a distal end of the robot.

DESCRIPTION OF EMBODIMENTS

A robot control system 10 according to a first embodiment of the present invention will be described below with reference to the drawings.

Figure 1:
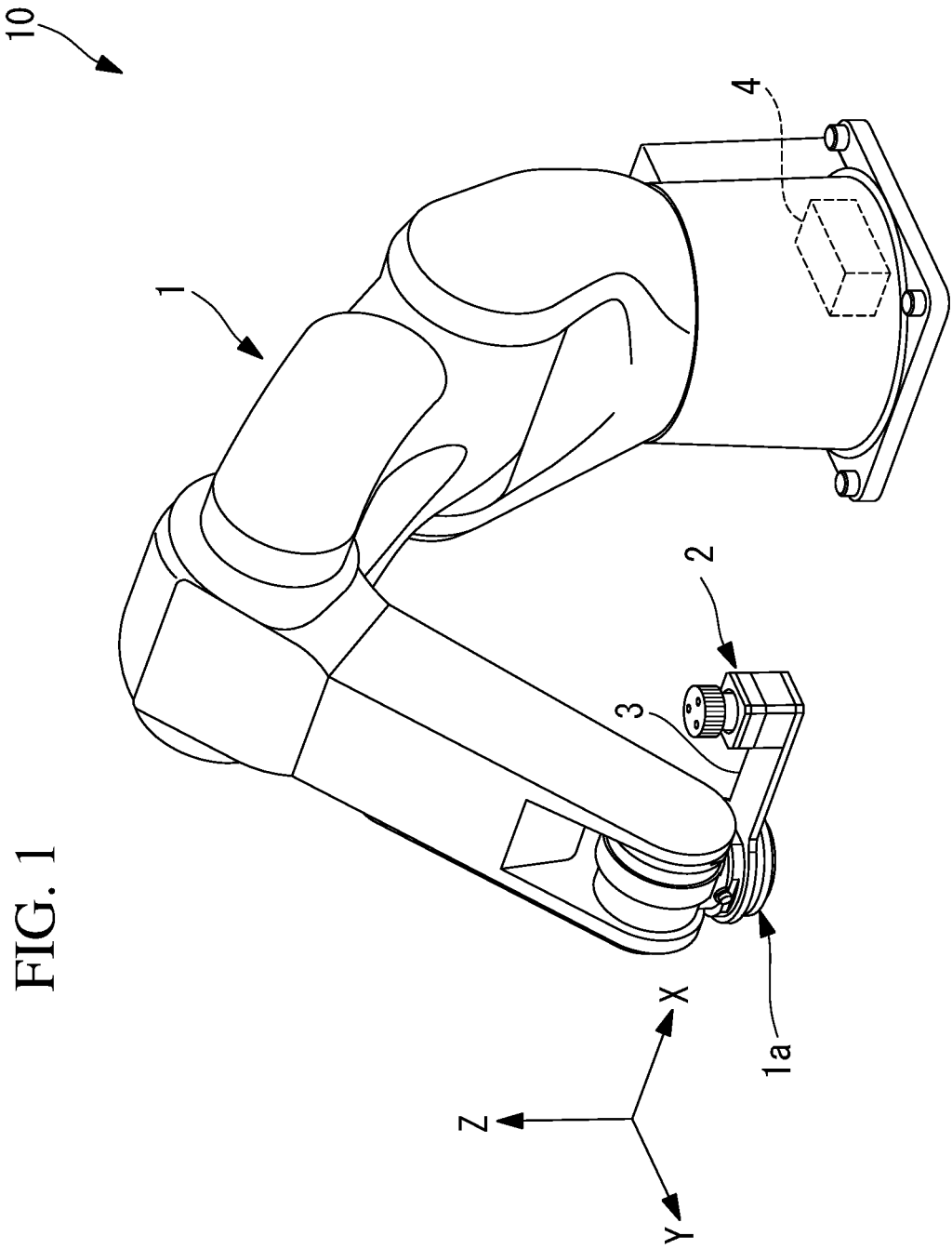
FIG. 1 schematically illustrates a robot control system according to a first embodiment.

As shown in FIG. 1, the control system 10 includes a controller (input device) 2 fixed, by means of an attachment plate 3, to a distal end 1a of a robot 1 serving as a vertical articulated robot, and also includes a control unit (control device) 4 that controls the robot 1. The robot 1 drives six joint shafts by rotationally driving six motors (not shown), and performs work by using, for example, a tool attached to the distal end 1a. A coordinate system constituted of X, Y, and Z axes that are orthogonal to one another, as shown in FIG. 1, is set at the distal end 1a. The rotational driving of the six motors that drive the joint shafts of the robot 1 is controlled by the control unit 4. The control unit 4 uses detection values of encoders (not shown), which detect the rotational angles of the respective motors, so as to perform feedback control on the motors.

Figure 2:
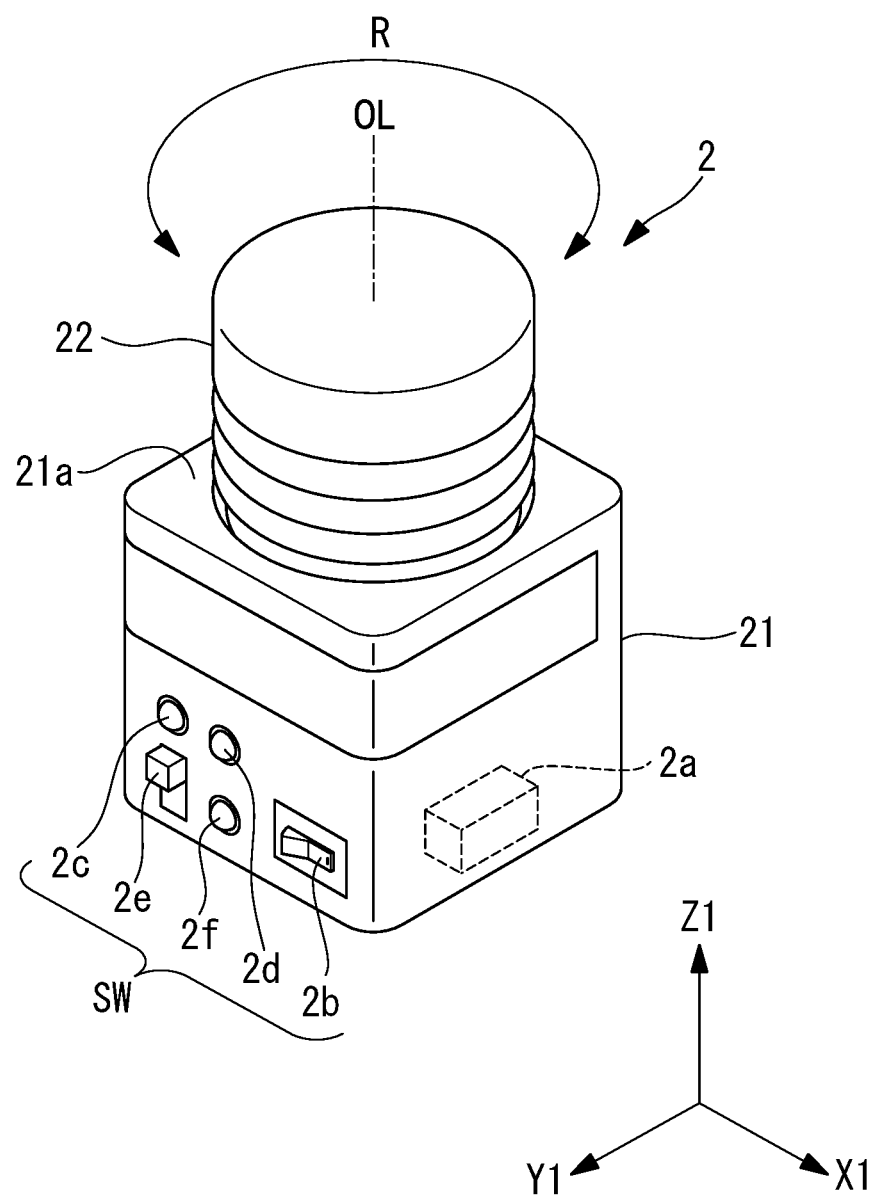
FIG. 2 is a perspective view of a controller.

The controller 2 receives an operation performed by a user and transmits an output signal based on the operation amount to the control unit 4. As shown in FIG. 2, the controller 2 includes a substantially rectangular base 21, a cylindrical movable section 22 one end of which is connected to a connection surface (predetermined surface) 21a serving as one of surfaces of the base 21, a detector 20 (not shown in FIG. 2) that is contained in the base 21 and that detects the amount of movement of the movable section 22, an output section 2a contained in the base 21, and a switch group SW having a plurality of switches each of which is manually operable for selecting between two types of output modes.

The movable section 22 is supported by the base 21 in a movable manner within a predetermined range along X1 and Y1 axes extending parallel to the connection surface 21a shown in FIG. 2. The movable section 22 is movable along a central axis OL of the movable section 22 that is orthogonal to the connection surface 21a, and is supported in a rotatable manner in a circumferential direction R about the central axis OL. The functions of the detector 20, the output section 2a, and the switch group SW will be described later. In the robot 1 according to this embodiment, the X1 axis, the Y1 axis, and the Z1 axis, which is the same as the central axis OL, in a coordinate system set in the controller 2 respectively correspond to the X, Y, and Z axes in the coordinate system set at the distal end 1a of the robot 1.

Figure 3:
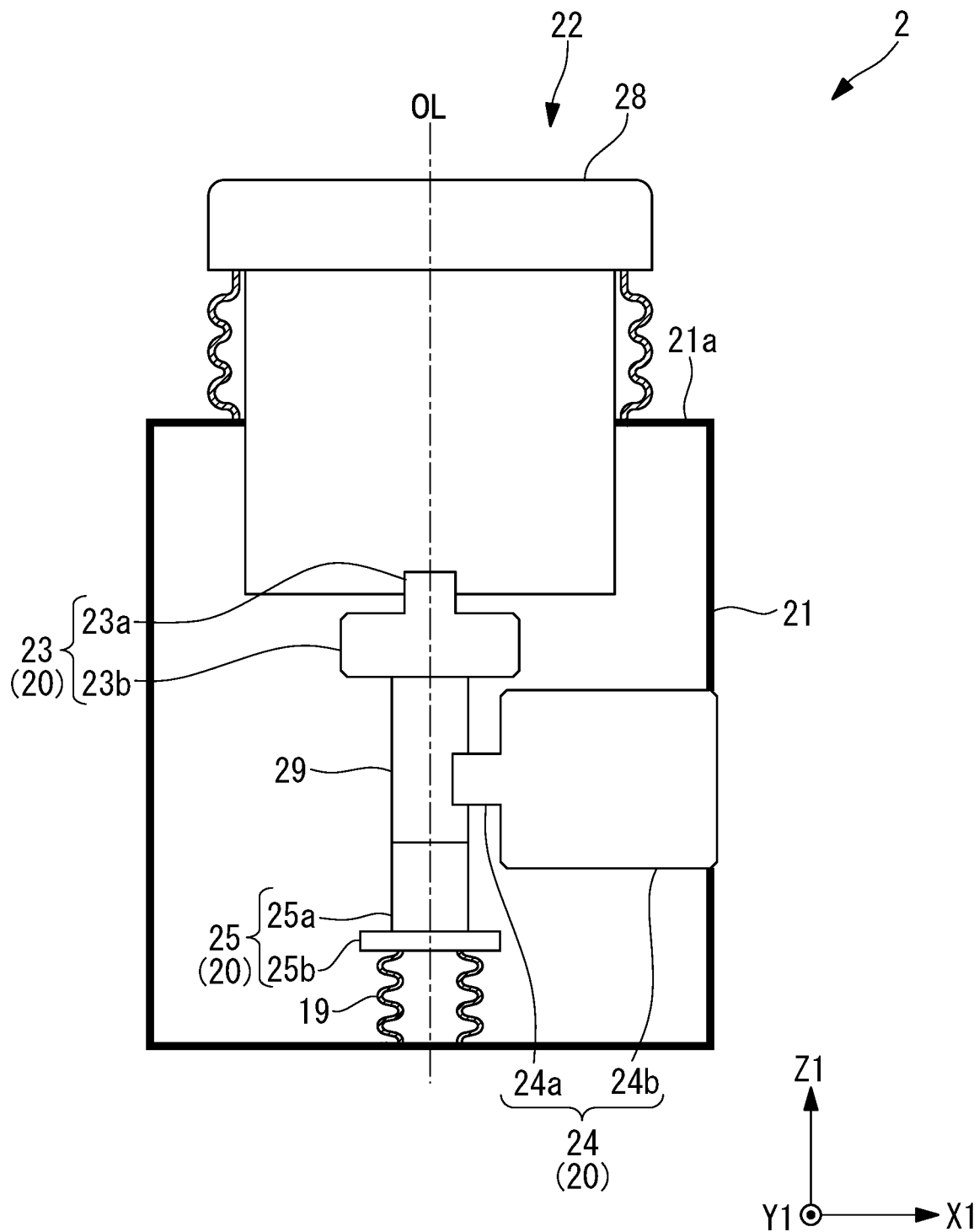
FIG. 3 is a cross-sectional view taken along a central axis of the controller.

FIG. 3 is a cross-sectional view of the controller 2, taken along the central axis OL.

The movable section 22 includes an operation reception section 28 that extends vertically through the connection surface 21a and that receives an operation performed by the user, a connection section 29 that is supported within the base 21 in a movable manner along the central axis OL and in a rotatable manner about the central axis OL, and an expandable-contractible section 19 that expands and contracts along the central axis OL.

As shown in FIG. 3, the expandable-contractible section 19 has one end fixed to the inner bottom surface of the base 21 and causes the operation reception section 28, when not receiving an operation, and the connection section 29 to expand and contract along the central axis OL relative to the base 21. Thus, the operation reception section 28 is movable along the central axis OL within the expandable-contractible range of the expandable-contractible section 19.

As shown in FIG. 3, the detector 20 includes a first movement-amount detector (detector) 23 disposed between the operation reception section 28 and the connection section 29, a Z1-axis rotation-amount detector (detector) 25 disposed between the connection section 29 and the expandable-contractible section 19, and a second movement-amount detector (detector) 24 disposed alongside the connection section 29.

The first movement-amount detector 23 is a slide volume knob that performs detection by resolving a movement amount parallel to the connection surface 21a, which is included in the amount of movement of the operation reception section 28 relative to the base 21, into a movement amount along the X1 axis and a movement amount along the Y1 axis. The first movement-amount detector 23 includes a base 23b fixed to the connection section 29 and a distal end 23a fixed to the operation reception section 28 in a movable manner relative to the base 23b along a plane extending parallel to the connection surface 21a. The base 23b is movable along the Z1 axis but is fixed in position in the plane extending parallel to the connection surface 21a. Therefore, when the operation reception section 28 moves above the connection surface 21a of the base 21, the distal end 23a of the first movement-amount detector 23 moves along the X1 axis and the Y1 axis relative to the base 23b. Accordingly, the first movement-amount detector 23 can detect the amount of movement of the operation reception section 28 along the X1 axis and the Y1 axis relative to the base 21.

The second movement-amount detector 24 is a slide volume knob that detects a movement amount along the Z1 axis extending orthogonally to the connection surface 21a, which is included in the amount of movement of the operation reception section 28 relative to the base 21. The second movement-amount detector 24 includes a base 24b fixed to an inner side surface of the base 21 and a distal end 24a fixed to the connection section 29 in a movable manner along the Z1 axis relative to the base 24b. Therefore, when the operation reception section 28 moves along the Z1 axis relative to the base 21, the distal end 24a of the second movement-amount detector 24 moves along the Z1 axis relative to the base 24b. Accordingly, the second movement-amount detector 24 can detect the amount of movement of the operation reception section 28 along the Z1 axis.

The Z1-axis rotation-amount detector 25 is a rotary volume knob that detects the amount of rotation of the operation reception section 28 about the central axis OL (Z1 axis) relative to the base 21. The Z1-axis rotation-amount detector 25 includes a base 25b that is connected to the bottom surface of the base 21 via the expandable-contractible section 19 and that is not rotatable about the Z1 axis, and also includes a rotation shaft 25a fixed to the connection section 29 in a rotatable manner about the Z1 axis relative to the base 25b. Therefore, when the operation reception section 28 rotates about the Z1 axis relative to the base 21, the rotation shaft 25a rotates about the Z1 axis relative to the base 25b. Accordingly, the Z1-axis rotation-amount detector 25 can detect the amount of rotation of the operation reception section 28 relative to the Z1 axis.

In this embodiment, the base 21 is provided with a spring (not shown) therein for returning the position of the operation reception section 28, when moving in parallel or rotating in response to an operation, to the position of the operation reception section 28 when not receiving an operation. An example of such a spring used is a compression coil spring or a torsion spring.

As shown in FIG. 2, the switch group SW includes a selection switch 2b, an input selection switch 2c of a push-button type, a manually-operable selection switch 2d of a push-button type, a teaching switch 2f of a push-button type, and a speed selection switch 2e of a vertically-slidable type. The selection switch 2b changes the correspondence relationship between a detection value of each detector and an output value from the output section 2a, which will be described later, in accordance with two types of output modes. The input selection switch 2c receives an operation other than the operation of the controller 2 and is used for selecting whether or not to manipulate the robot. Specifically, it can be set whether or not to manipulate the robot 1 by operating the controller 2 alone in accordance with an output mode of the input selection switch 2c. The manually-operable selection switch 2d is used for selecting whether or not to receive an operation from the controller 2. The teaching switch 2f is used for selecting whether or not to record the movement of the robot 1 being manipulated. The speed selection switch 2e is used for selecting the moving speed of the robot 1 between high speed and low speed.

The output section 2a outputs, to the control unit 4 of the robot 1, the movement amounts of the operation reception section 28 along the X1 and Y1 axes detected by the first movement-amount detector 23, the movement amount of the operation reception section 28 along the Z1 axis detected by the second movement-amount detector 24, and the rotation amount of the operation reception section 28 about the Z1 axis detected by the Z1-axis rotation-amount detector 25 as output values from six different types of channels. The output section 2a outputs the detected detection values via different channels in accordance with the output mode set by the selection switch 2b. The selection switch 2b is used for selecting between two output modes, namely, a parallel movement mode in which the detection values of the first movement-amount detector 23 are output as parallel-movement output values and a rotational movement mode in which the detection values are output as rotational output values, in accordance with an operation performed by the user.

Figure 4:
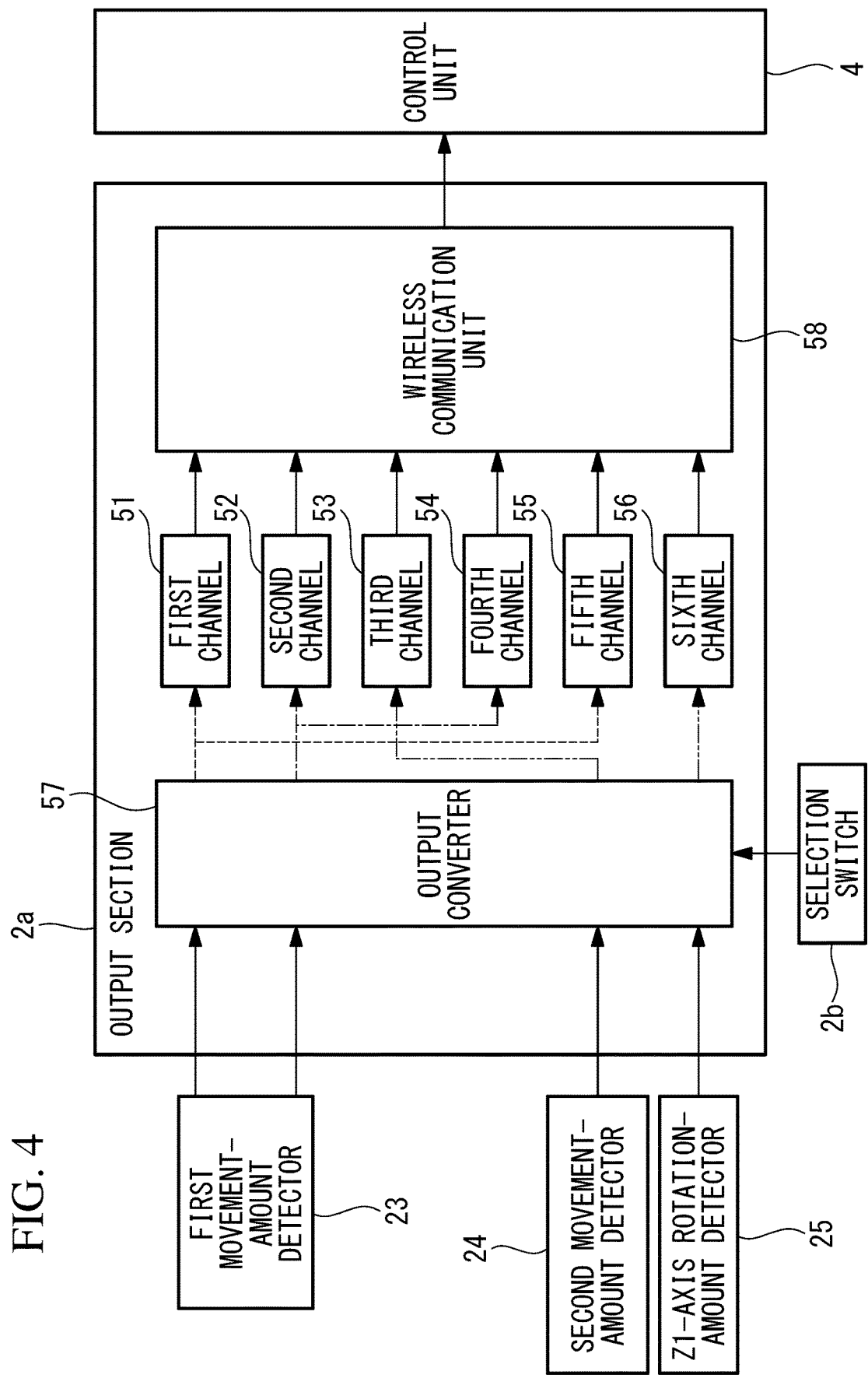
FIG. 4 is a block diagram of an output unit and surrounding components.

As shown in FIG. 4, the output section 2a includes an output converter 57 that receives the detected detection values and transmits the detection values as output values to the respective channels, six types of channels, namely, a first channel (output channel) 51 to a sixth channel (output channel) 56, from which output values are output, and a wireless communication unit 58 that transmits the output values from the channels 51 to 56 to the control unit 4 of the robot 1.

If the output mode of the selection switch 2b is the parallel movement mode, the output converter 57 transmits the detection values in the X1-axis direction and the Y1-axis direction detected by the movement-amount detector 23 to the first channel 51 and the second channel 52 and transmits the detection value in the Z1-axis direction detected by the second movement-amount detector 24 to the third channel 53. Furthermore, if the output mode of the selection switch 2b is the parallel movement mode, the output converter 57 does not transmit the detection value about the Z1 axis detected by the Z1-axis rotation-amount detector 25 to any of the output channels.

If the output mode of the selection switch 2b is the rotational movement mode, the output converter 57 transmits the detection value in the X1-axis direction detected by the movement-amount detector 23 to the fifth channel 55, the detection value in the Y1-axis direction to the fourth channel 54, and the detection value about the Z1 axis detected by the Z1-axis rotation-amount detector 25 to the sixth channel 56. Furthermore, if the output mode of the selection switch 2b is the rotational movement mode, the output converter 57 does not transmit the detection value in the Z1-axis direction detected by the second movement-amount detector 24 to any of the output channels.

The wireless communication unit 58 transmits the output values output via the channels 51 to 56 as control signals to the control unit 4.

The control unit 4 drives the motors for the joint shafts by using the output values of the channels 51 to 56 transmitted from the wireless communication unit 58 as the movement amounts along the respective axes and the rotation amounts about the respective axes in the coordinate system set at the distal end 1a of the robot 1, thereby changing the position and orientation of the distal end 1a. Specifically, the control unit 4 moves the distal end 1a along the X axis in accordance with the output value of the first channel 51, moves the distal end 1a along the Y axis in accordance with the output value of the second channel 52, and moves the distal end 1a along the Z axis in accordance with the output value of the third channel 53. The control unit 4 rotates the distal end 1a about the X axis in accordance with the output value of the fourth channel 54, rotates the distal end 1a about the Y axis in accordance with the output value of the fifth channel 55, and rotates the distal end 1a about the Z axis in accordance with the output value of the sixth channel 56.

Because the output values of the channels 51 to 56 are associated with the amounts of change in the position and orientation of the distal end 1a of the robot 1, if the selection switch 2b is in the parallel movement mode, the distal end 1a of the robot 1 is positionally moved in parallel along the respective axes of the operation reception section 28 in the movable section 22 in accordance with the parallel movement amounts of the operation reception section 28 along the respective axes.

If the selection switch 2b is in the rotational movement mode, the distal end 1a of the robot 1 rotates along the X axis, that is, about the Y axis, in accordance with the amount of movement of the operation reception section 28 along the X1 axis, and rotates along the Y axis, that is, about the X axis, in accordance with the amount of movement of the operation reception section 28 along the Y1 axis. In accordance with the amount of rotation of the operation reception section 28 about the Z1 axis, the distal end 1a of the robot 1 rotates about the Z axis.

Accordingly, in the control system 10 of the robot 1 according to this embodiment, when the user three-dimensionally operates the operation reception section 28 in the movable section 22 of the controller 2, the amount of movement of the operation reception section 28 is detected by being resolved into movement amounts that are parallel to three orthogonal axes. In accordance with the detection values, movement amounts parallel to the three axes or rotation amounts about the three axes in the coordinate system set at the distal end 1a of the robot 1 and associated with the coordinate system of the operation reception section 28 are output. Consequently, the user can intuitively change the position and orientation of the distal end 1a of the robot 1 by operating the operation reception section 28. Because the controller 2 according to this embodiment is constituted of the base 21 and the movable section 22, which is movable relative to the base 21, as hardware components, a compact, lightweight configuration can be achieved.

In the control system 10 according to this embodiment, the output mode can be changed by using the selection switch 2b, thereby allowing for output of six degrees of freedom, which is larger in number than four degrees of freedom, relative to detection of four degrees of freedom by operating the movable section 22. This allows for output of a larger number of degrees of freedom without increasing the size of the controller 2 including the movable section 22. In a case where the selection switch 2b is in the rotational movement mode, the movement amounts of the operation reception section 28 along the X1 axis and the Y1 axis are respectively output as the rotation amounts of the distal end 1a of the robot 1 about the Y axis and the X axis. Consequently, in the control system 10 according to this embodiment, a parallel movement amount of the operation reception section 28 received as an operation can be output as a rotation amount of the distal end 1a of the robot 1, which is easily and intuitively recognizable by the user.

Figure 5:
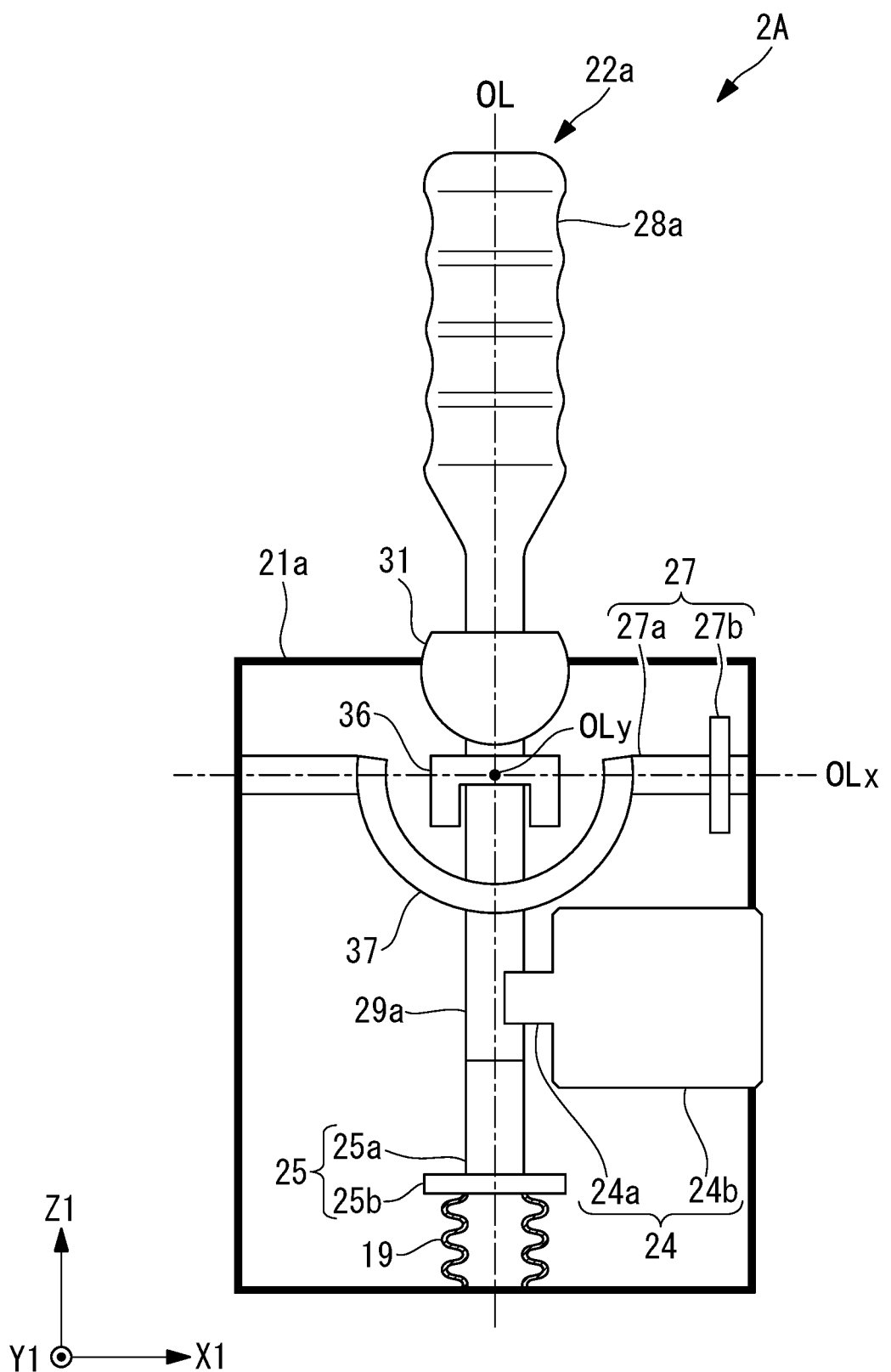
FIG. 5 is a cross-sectional view taken along a central axis of a controller according to a second embodiment.
Figure 6:
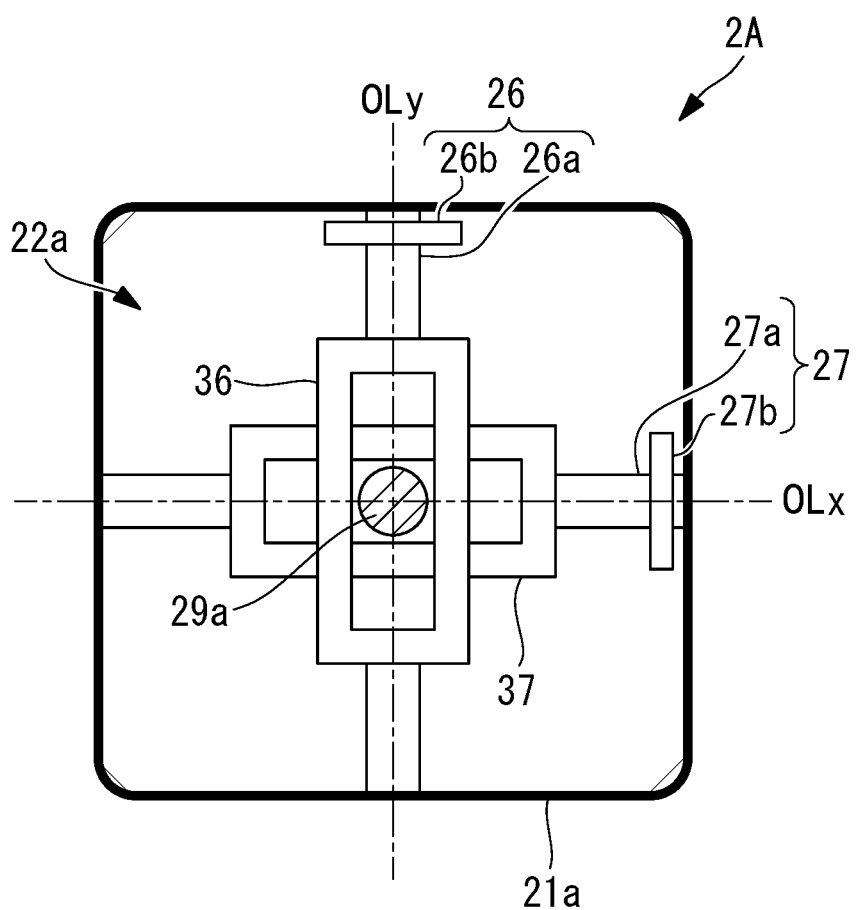
FIG. 6 is a cross-sectional view taken along a plane extending parallel to a connection surface of the controller according to the second embodiment.

FIG. 5 is a cross-sectional view taken along the central axis OL of a controller 2A according to a second embodiment. FIG. 6 is a cross-sectional view of the controller 2A, taken along a plane extending parallel to the connection surface 21a. The controller 2A according to the second embodiment is different from the controller 2 according to the first embodiment in that the controller 2A is of a joystick type in which an operation reception section 28a of a movable section 22a is tiltable about a predetermined fulcrum and in having different detectors for detecting an operation amount of the operation reception section 28a. Therefore, in the second embodiment, components different from those in the first embodiment will be described, and descriptions of components identical to those in the first embodiment will be omitted.

As shown in FIG. 5, the movable section 22a included in the controller 2A includes a spherical joint 31 disposed in the connection surface 21a, an operation reception section 28a extending upward from the spherical joint 31, a connection section 29a extending downward from the spherical joint 31, and an expandable-contractible section 19 that expands and contracts along the central axis OL.

As shown in FIGS. 5 and 6, the movable section 22a includes a first rotating body 36 fixed to the connection section 29a in a rotatable manner about a rotation axis (tilt axis) OLy extending parallel to the Y1 axis, and also includes a second rotating body 37 fixed to the connection section 29a in a rotatable manner about a rotation axis (tilt axis) OLx extending parallel to the X1 axis.

The operation reception section 28a is disposed in a tiltable manner relative to the connection surface 21a about the spherical joint 31 fixed to the connection surface 21a acting as a fulcrum. Because the connection section 29a is fixed to the operation reception section 28a via the spherical joint 31, the first rotating body 36 and the second rotating body 37 fixed to the connection section 29a rotate about the rotation axis OLy and the rotation axis OLx in accordance with the tilting of the operation reception section 28a.

As shown in FIGS. 5 and 6, the detectors according to the second embodiment include a Z1-axis rotation-amount detector 25 and a second movement-amount detector 24 that have configurations identical to those in the first embodiment, a first rotation-amount detector (detector) 26 that detects the amount of rotation of the first rotating body 36 about the rotation axis OLy relative to the base 21, and a second rotation-amount detector (detector) 27 that detects the amount of rotation of the second rotating body 37 about the rotation axis OLx relative to the base 21.

The first rotation-amount detector 26 has its opposite ends fixed to an inner side surface of the base 21 and the first rotating body 36 and is a rotary volume knob that detects the rotation amount of the first rotating body 36 relative to the base 21, that is, a tilt angle by which the operation reception section 28a is tilted about the rotation axis OLy. As shown in FIG. 6, the first rotation-amount detector 26 includes a base 26b fixed to the inner side surface of the base 21, and also includes a rotation shaft 26a that is supported in a rotatable manner about the rotation axis OLy relative to the base 26b and that is fixed to the first rotating body 36. When the operation reception section 28a is tilted to cause the first rotating body 36 to rotate about the rotation axis OLy, the first rotation-amount detector 26 detects the rotational angle of the rotation shaft 26a relative to the base 26b fixed to the base 21.

The second rotation-amount detector 27 has its opposite ends fixed to an inner side surface of the base 21 and the second rotating body 37 and is a rotary volume knob that detects a tilt angle by which the operation reception section 28a is tilted about the rotation axis OLx. The second rotation-amount detector 27 includes a base 27b fixed to the inner side surface of the base 21, and also includes a rotation shaft 27a that is supported in a rotatable manner about the rotation axis OLx relative to the base 27b and that is fixed to the second rotating body 37. When the operation reception section 28a is tilted to cause the second rotating body 37 to rotate about the rotation axis OLx, the second rotation-amount detector 27 detects the rotational angle of the rotation shaft 27a relative to the base 27b fixed to the base 21.

In the second embodiment, the rotation amount about the rotation axis OLy and the rotation amount about the rotation axis OLx are detected in place of the movement amounts of the operation reception section 28 along the X1 axis and the Y1 axis detected in the first embodiment. The output section 2a outputs detection values as output values of either the first channel 51 and the second channel 52 or the third channel 53 and the fourth channel 54 in accordance with the output mode of the selection switch 2b. Accordingly, in the output section 2a according to the second embodiment, the tilt angle of the operation reception section 28a of the movable section 22a that is tiltable relative to the connection surface 21a of the base 21 is detected as an operation amount, and the detection value is used as an output value for changing the position and orientation of the coordinate system set at the distal end 1a of the robot 1.

In the control system 10 of the robot 1 according to each of the above-described embodiments, the controller 2 or 2A is described as being attached to the distal end 1a of the robot 1 by means of the attachment plate 3, as shown in FIG. 1. Alternatively, various modifications are possible with respect to the position to which the controller 2 or 2A is attached. For example, the controller 2 or 2A may be attached directly to any position on the arm of the robot 1, and the orientation in which the controller 2 or 2A is attached is also changeable. By associating the coordinate system of the controller 2 or 2A with the coordinate system of the distal end 1a of the robot 1 every time in accordance with the attachment position and the attachment direction of the controller 2 or 2A, an intuitive operation can be performed by the user. A movable section that is three-dimensionally movable relative to the base 21 is capable of moving both in parallel and rotating relative to the base 21.

In each of the above-described embodiments, the slide volume knob serving as the movement-amount detector 23 and the rotary volume knob serving as the first rotation-amount detector 26 are used for detecting the operation amount of the operation reception section 28 or 28a in the movable section 22 or 22a. However, the type of the detector 20 for detecting the operation amount of the movable section 22 or 22a is not limited to the type described in the above-described embodiments, and a known technology may be applied. Although output values with respect to three degrees of freedom are output in the controller 2 or 2A according to each of the above-described embodiments, for example, the output section 2a may output an output value corresponding to a detected rotation amount about the Z1 axis in addition to the output values according to the movement amounts along the respective axes when the selection switch 2b is in the parallel movement mode, so that output values with respect to four degrees of freedom are output.

In the above-described embodiments, the output values from the output channels 51 to 56 of the output section 2a are associated with six degrees of freedom of the distal end 1a of the robot 1. Alternatively, various modifications are possible with respect to control associated with the output value of each of the channels 51 to 56. For example, the output section 2a may include four output channels and may output, via the four output channels, a total of four detection values, namely, three detection values of the movement amounts of the movable section 22 along three axes, that is, the X axis to the Z axis, and a signal indicating the mode of the selection switch 2b. As another alternative, the output section 2a may include five output channels and may output, via the five output channels, a total of five detection values, namely, three detection values of the movement amounts of the movable section 22 along three axes, that is, the X axis to the Z axis, a detection value of the rotation amount about the Z1 axis detected by the Z1-axis rotation-amount detector 25, and a signal indicating the mode of the selection switch 2b. Accordingly, the mode of the selection switch 2b is set as an output value of an output channel, so that an operation amount as a three-dimensional movement amount or as a three-dimensional movement amount and a rotation amount along a single axis can be treated as input with respect to six degrees of freedom.

As an alternative to each of the above-described embodiments in which the controller 2 or 2A includes the selection switch 2b and the output section 2a, these components do not have to be provided. For example, even if the controller 2 or 2A does not have the selection switch 2b, it is still possible to intuitively change the position and orientation of the coordinate system set at the distal end 1a of the robot 1 in accordance with the operation amount detected by the detector 20. The detector 20 may output the detection value as an output value without the intervention of the output section 2a.

As a result, the following aspect is read from the above described embodiment of the present invention.

An aspect of the present invention provides an input device including: a base; a movable section supported in a three-dimensionally movable manner relative to the base; and a detector that performs detection by resolving an operation amount of the movable section relative to the base into parallel movement amounts along a first axis and a second axis, which extend parallel to a predetermined surface of the base and are orthogonal to each other, and a parallel movement amount along a third axis that is orthogonal to the first axis and the second axis.

According to this aspect, when the operator performs an operation to three-dimensionally move the movable section relative to the base, the operation amount, that is, the movement amount of the movable section, is detected by the detector by being resolved into movement amounts parallel to three orthogonal axes. Output values corresponding to the detected movement amounts along the three axes are associated with, for example, movement amounts along three orthogonal axes in a coordinate system set at the distal end of the robot, so that the robot can be intuitively manipulated by the movement amount corresponding to the operation amount applied by the operator. According to this aspect, since the hardware is constituted of the base and the movable section, a compact, lightweight configuration can be achieved.

In the above aspect, the movable section may be supported so as to be movable in parallel, without rotating relative to an axis extending parallel to the predetermined surface.

Accordingly, when the movable section is operated relative to the base so as to move in parallel, the operation amount is detected by the detector by being resolved into movement amounts along the first to third axes. Consequently, the robot can be manipulated more intuitively.

In the above aspect, the movable section may be supported by the base so as to be movable in parallel along the first to third axes.

Accordingly, when the movable section is operated relative to the base so as to move along the first to third axes, the operation amount is directly detected by the detector as movement amounts along the first to third axes. Consequently, the robot can be manipulated more intuitively.

In the above aspect, the movable section may be supported by the base in a tiltable manner about two tilt axes extending parallel to the predetermined surface and intersecting each other and in a movable manner in a linear direction intersecting the two tilt axes. Moreover, the detector may perform the detection by converting a tilt angle as the operation amount of the movable section into parallel movement amounts along the first axis and the second axis and by resolving the operation amount of the movable section in the linear direction into the parallel movement amount along the third axis.

Accordingly, the movable section is constituted of a joystick that tilts two-dimensionally like a lever, and the lever itself is movable also in the linear direction, so that three operation amounts can be input. Consequently, the three operation amounts can be detected by being resolved into movement amounts along the three axes, so that the robot can be manipulated intuitively.

In the above aspect, the input device may further include a selection switch that is switched such that detection values corresponding to the parallel movement amounts along the first to third axes are output as output values with different contents.

Accordingly, by actuating the selection switch, the three-dimensional operation amounts can be output in association with movement amounts with respect to degrees of freedom larger in number than three degrees of freedom.

In the above aspect, the input device may further include four output channels. Detection values obtained by the detector corresponding to three-dimensional operation amounts of the movable section and a mode of the selection switch may be output from the output channels.

Accordingly, by treating the three-dimensional operation amounts as inputs in different directions in accordance with the mode of the switch, the three-dimensional operation amounts can be treated as inputs with respect to six degrees of freedom.

In the above aspect, the input device may further include six output channels. The selection switch may be switched such that detection values obtained by the detector corresponding to three-dimensional operation amounts of the movable section are output from three of the output channels.

Accordingly, the three-dimensional operation amounts can be output as output values with respect to six degrees of freedom via the six output channels.

In the above aspect, the movable section may be supported in a rotatable manner about the three axes relative to the base, and the detector may detect operation amounts of the movable section about the three axes as rotational movement amounts about the three axes.

Accordingly, the detector can detect the rotational operation amount about the third axis in addition to the operation amounts along the three orthogonal axes, so that a compact input mechanism with four degrees of freedom can be achieved without increasing the size of the input device.

In the above aspect, the input device may further include: a selection switch that is switched such that detection values corresponding to the parallel movement amounts along the first axis and the second axis are output as output values with different contents; and five output channels. The parallel movement amounts along the first to third axes, a rotational movement amount about the third axis, and a mode of the selection switch may be output from the output channels.

Accordingly, by using the selection switch to switch between a three-degrees-of-freedom-based operation mode in which movement amounts along the first to third axes are input and a three-degrees-of-freedom-based operation mode in which operation amounts along the first and second axes and a rotational operation amount about the third axis are input, a mechanism with six degrees of freedom can be operated.

In the above aspect, the input device may further include six output channels and a selection switch that is switched between a mode in which three-dimensional operation amounts of the movable section are output as the parallel movement amounts along the first to third axes from three of the output channels and a mode in which operation amounts along the first axis and the second axis and an operation amount about the third axis are output as rotational movement amounts about the second axis, the first axis, and the third axis from three different channels of the output channels.

Accordingly, by using the selection switch, six-degrees-of-freedom output can be achieved with respect to four-degrees-of-freedom input via the six channels. Because the three channels from which parallel movement amounts along the first to third axes are output are different from the three channels from which operation amounts along the first and second axes and a rotational operation amount about the third axis are output as rotational movement amounts about the three axes, for example, it is possible to switch between the parallel movement mechanism and the rotational movement mechanism of the robot in the coordinate system set in the robot by operating the selection switch. Specifically, the operator can perform a switching operation by using the selection switch so that the operator can intuitively perform an operation on the same movable section for switching between the parallel movement mechanism and the rotational movement mechanism of the robot.

Another aspect of the present invention provides a robot control system including the aforementioned input device and a control device that associates output values, corresponding to the parallel movement amounts along the first to third axes, output from the input device with parallel movement amounts along three orthogonal axes in a coordinate system set at a distal end of the robot.

Accordingly, the operator using the input device can intuitively manipulate the robot by operating the movable section along the three axes along which the distal end of the robot is desirably moved. In the control system according to this aspect, since the hardware serving as the input device is constituted of the base and the movable section, the input device can be made compact and lightweight.

Another aspect of the present invention provides a robot control system including the aforementioned input device and a control device that associates output values, corresponding to the parallel movement amounts along the first and second axes, output from the input device and an output value corresponding to the rotational movement amount about the third axis with rotational movement amounts about three orthogonal axes in a coordinate system set at a distal end of the robot.

Accordingly, since the movement amounts along the first and second axes and the rotation amount about the third axis are associated with the rotation amount of the distal end of the robot, the operator using the input device can intuitively manipulate the robot by operating the movable section in a direction in which the operator desires to change the orientation of the distal end of the robot.

REFERENCE SIGNS LIST 1 robot
2, 2A controller (input device)
2a output section
2b selection switch
4 control unit (control device)
20 detector
21 base
21a connection surface (predetermined surface)
22, 22a movable section
23 first movement-amount detector (detector)
24 second movement-amount detector (detector)
25 Z1-axis rotation-amount detector (detector)
26 first rotation-amount detector (detector)
27 second rotation-amount detector (detector)
28, 28a operation reception section
51 first channel (output channel)
52 second channel (output channel)
53 third channel (output channel)
54 fourth channel (output channel)
55 fifth channel (output channel)
56 sixth channel (output channel)
OLx rotation axis (tilt axis)
OLy rotation axis (tilt axis)

The invention claimed is:

1. An input device for manipulating a robot, the input device comprising:
a base;
a movable section supported in a three-dimensionally movable manner relative to the base;
a detector comprising a first movement-amount detector, a second movement-amount detector, and a rotation-amount detector, wherein the first movement-amount detector performs detection by resolving an operation amount of the movable section relative to the base into parallel movement amounts along a first axis and a second axis, which extend parallel to a predetermined surface of the base and are orthogonal to each other, and wherein the second movement-amount detector detects a parallel movement amount along a third axis that is orthogonal to the first axis and the second axis;
a selection switch that can be switched such that detection values corresponding to the parallel movement amounts along the first to third axes are output as output values with different contents;
an output channel configured to output information indicating a mode of the selection switch, wherein the mode of the selection switch is set as an output value of the output channel; and
at least one other output channel configured to output a detection value detected by the detector.

2. The input device according to claim 1, wherein the movable section is supported so as to be movable in parallel, without rotating relative to an axis extending parallel to the predetermined surface.

3. The input device according to claim 2, wherein the movable section is supported by the base so as to be movable in parallel along the first to third axes.

4. The input device according to claim 1, wherein:
the movable section is supported by the base in a tiltable manner about two tilt axes extending parallel to the predetermined surface and intersecting each other and in a movable manner in a linear direction intersecting the two tilt axes; and
the detector performs the detection by converting a tilt angle as the operation amount of the movable section into parallel movement amounts along the first axis and the second axis and by resolving the operation amount of the movable section in the linear direction into the parallel movement amount along the third axis.

5. The input device according to claim 1, further comprising:
at least three other output channels; and
detection values obtained by the detector corresponding to three-dimensional operation amounts of the movable section are output from the output channels.

6. The input device according to claim 1, wherein:
the movable section is supported in a rotatable manner about the three axes relative to the base; and
the detector detects operation amounts of the movable section about the three axes as rotational movement amounts about the three axes.

7. The input device according to claim 6, wherein:
the selection switch is switched such that detection values corresponding to the parallel movement amounts along the first axis and the second axis are output as output values with different contents;
wherein the input device further comprises at least four other output channels; and
the parallel movement amounts along the first to third axes and a rotational movement amount about the third axis are output from the output channels.

8. A robot control system comprising:
an input device for manipulating a robot, the input device comprising:
a base;
a movable section supported in a three-dimensinally movable manner relative to the base;
a detector comprising a first movement-amount detector, a second movement-amount detector, and a rotation-amount detector, wherein the first movement-amount detector performs detection by resolving an operation amount of the movable section relative to the base into parallel movement amounts along a first axis and a second axis, which extend parallel to a predetermined surface of the base and are orthogonal to each other, and wherein the second movement-amount detector detects a parallel movement amount along a third axis that is orthogonal to the first axis and the second axis;

a selection switch that can be switched such that detection values corresponding to the parallel movement amounts along the first to third axes are output as output values with different contents;

an output channel configured to output information indicating a mode of the selection switch, wherein the mode of the selection switch is set as an output value of the output channel; and at least one other output channel configured to output a detection value detected by the detector; and a control device that associates output values, corresponding to the parallel movement amounts along the first to third axes, output from the input device with parallel movement amounts along three orthogonal axes in a coordinate system set at a distal end of the robot.

9. A robot control system comprising:

an input device for manipulating a robot, the input device comprising:

a base;

a movable section supported in a three-dimensionally movable manner relative to the base;

a detector comprising a first movement-amount detector, a second movement-amount detector, and a rotation-amount detector, wherein the first movement-amount detector performs detection by resolving an operation amount of the movable section relative to the base into parallel movement amounts along a first axis and a second axis, which extend parallel to a predetermined surface of the base and are orthogonal to each other, and wherein the second movement-amount detector detects a parallel movement amount along a third axis that is orthogonal to the first axis and the second axis;

a selection switch that can be switched such that detection values corresponding to the parallel movement amounts along the first to third axes are output as output values with different contents;

an output channel configured to output information indicating a mode of the selection switch, wherein the mode of the selection switch is set as an output value of the output channel; and at least one other output channel configured to output a detection value detected by the detector;

a control device that associates output values, corresponding to the parallel movement amounts along the first and second axes, output from the input device and an output value corresponding to the rotational movement amount about the third axis with rotational movement amounts about three orthogonal axes in a coordinate system set at a distal end of the robot;

wherein the movable section is supported in a rotatable manner about the three axes relative to the base; and wherein the detector detects operation amounts of the movable section about the three axes as rotational movement amounts about the three axes.

10. The input device according to claim 1, wherein the first movement-amount detector comprises a slide volume knob.

11. The input device according to claim 1, wherein the second movement-amount detector comprises a slide volume knob.

12. The input device according to claim 1, wherein the rotation-amount detector comprises a rotary volume knob.

* * * * *